Jan. 14, 1941.   O. R. HUGGINS   2,229,014
PRODUCTION OF PRINTING SURFACES BY PHOTOMECHANICAL METHODS
Filed March 3, 1938   3 Sheets-Sheet 1
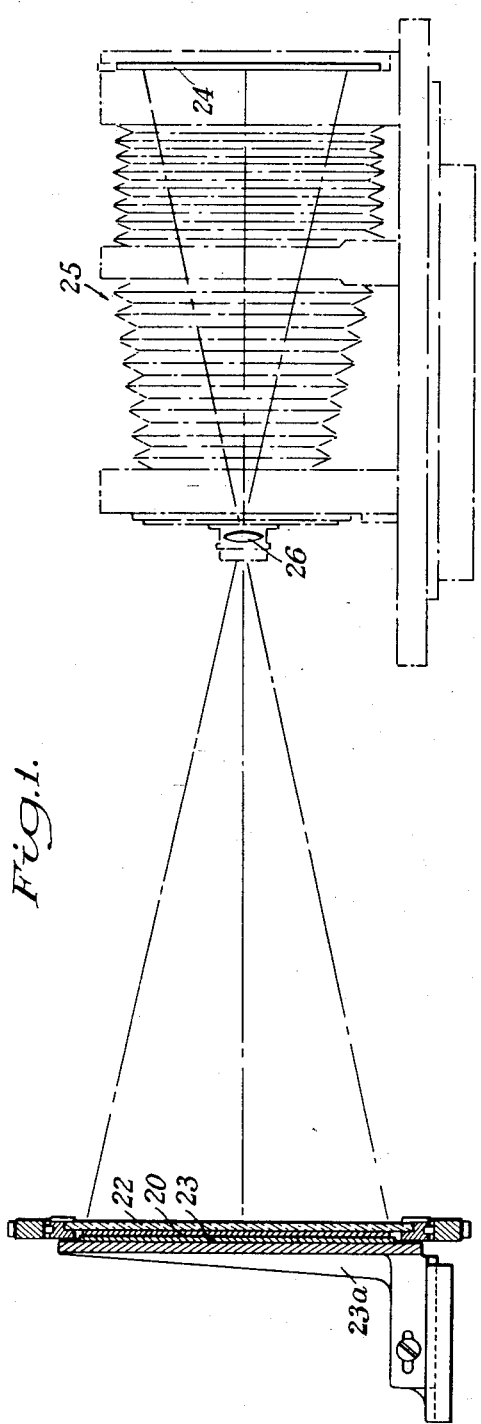
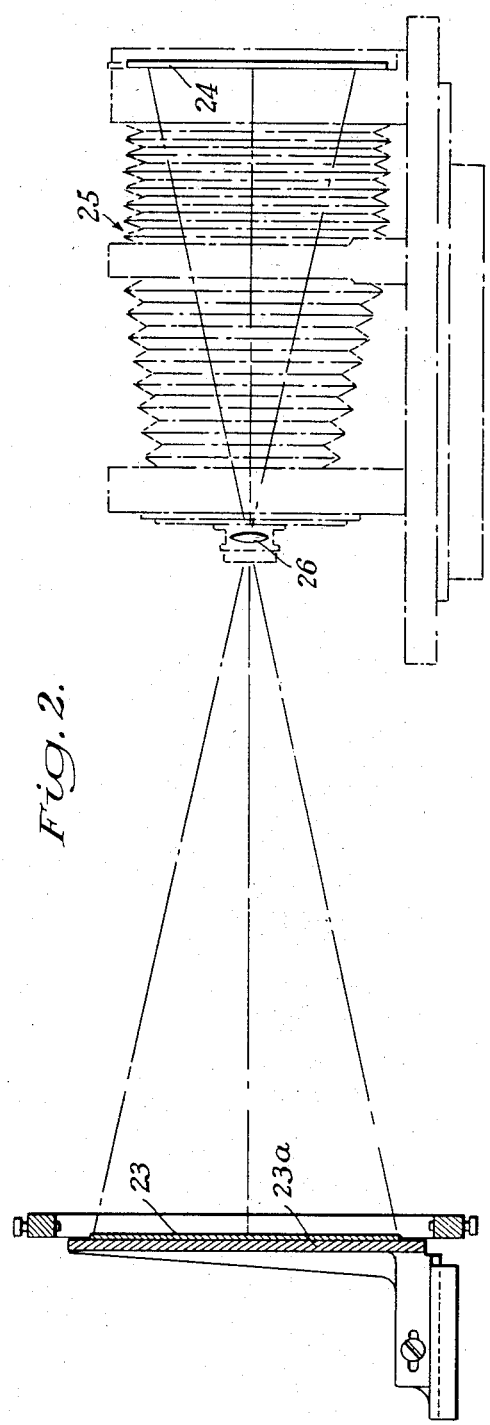
INVENTOR
Owen R. Huggins
BY Frank G. Braham
ATTORNEY

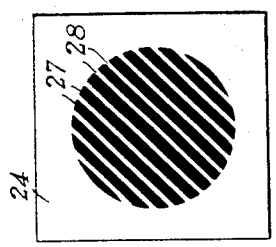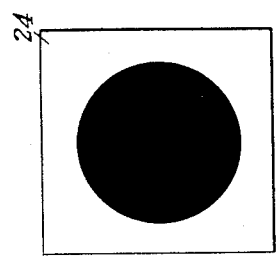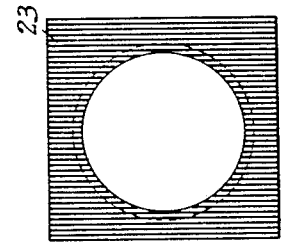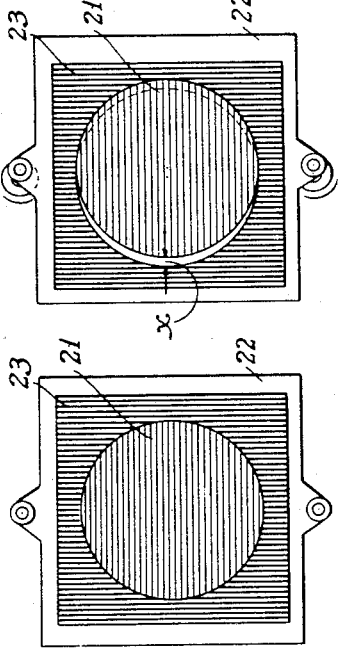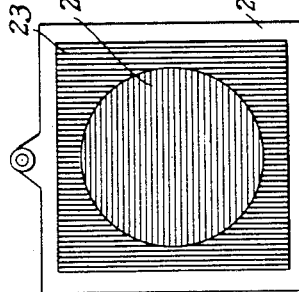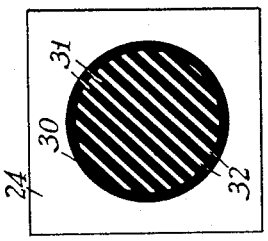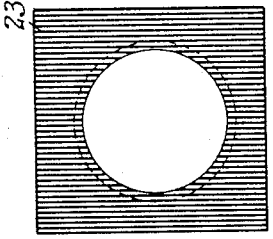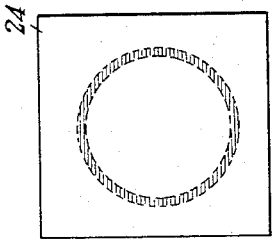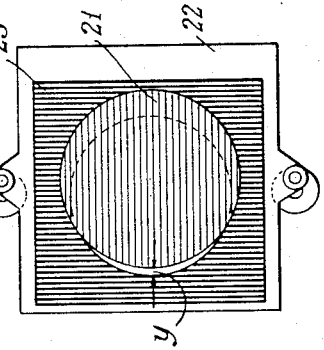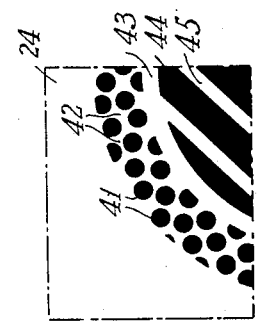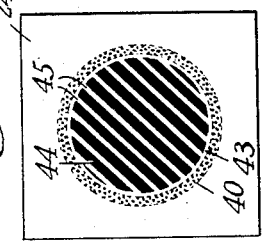

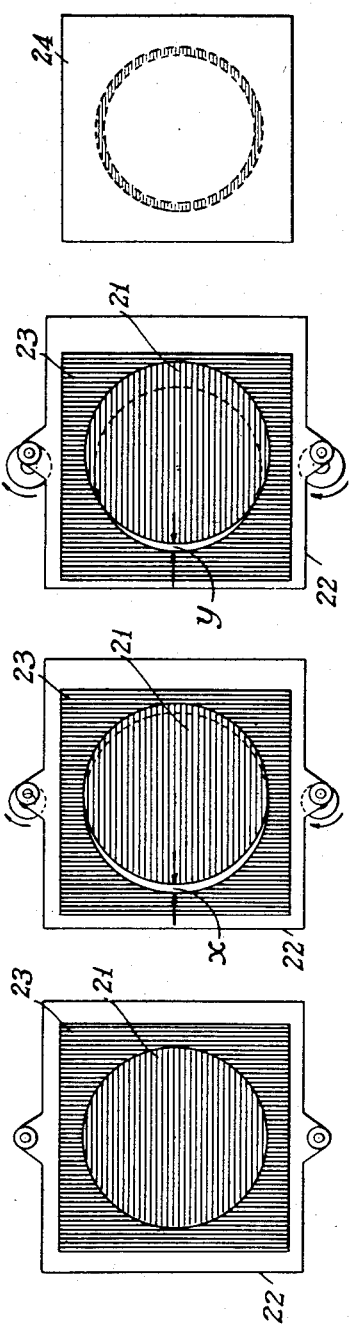

Patented Jan. 14, 1941

2,229,014

UNITED STATES PATENT OFFICE 2,229,014

PRODUCTION OF PRINTING SURFACES BY PHOTOMECHANICAL METHODS

Owen R. Huggins, South Norwalk, Conn., assignor to Linotone Corporation, a corporation of New York Application March 3, 1938, Serial No. 193,635

22 Claims. (Cl. 95—5)

This invention relates to the production of etched printing surfaces, and it is concerned, more particularly, with the production of etched printing surfaces by photomechanical methods for printing on textiles and the like.

Various photomechanical methods have already been proposed for producing such printing surfaces, but these methods have met with little or no success from a commercial standpoint, as evidenced by the fact that, in general, such surfaces are still being produced by the old and well known pantograph method, which method is a long, tedious, and expensive operation, particularly when the design is made up of a multiplicity of design elements.

The present invention aims to avoid these objectionable factors and to so simplify the operation that printing surfaces may be produced speedily, accurately, and at little expense as compared with the more complicated procedures heretofore employed.

For a complete description as to how the improved process is carried out reference may be made to the accompanying drawings wherein the design to be etched on the printing member is shown, by way of example, as consisting of a circle. It is to be understood, however, that the invention is not limited to the production of this particular design on a printing member, but is applicable as well to the production of other designs.

In the drawings:

Fig. 1 is a diagrammatic view of a portion of apparatus that may be employed in practicing the present invention showing a positive of a design element mounted in intimate contact with a light reflecting surface;

Fig. 2 is a view similar to Fig. 1 but with the image bearing positive removed from in front of the light reflecting surface;

Figs. 3 to 6 inclusive, are diagrammatic views which aid in the understanding of the various steps employed in the process of creating a marginally reduced positive of the design element which may thereafter be used to produce on a printing member a reproduction of the design elements without ground lines;

Figs. 3 to 7 inclusive, are diagrammatic views which aid in the understanding of the various steps employed in the process of creating a marginally reduced positive of the design element which may thereafter be used to produce on a printing member a reproduction of the design element with ground lines;

Figs. 3 to 5 inclusive, and Figs. 4a to 4d inclusive, are diagrammatic views which aid in the understanding of the various steps employed in the process of creating a marginally reduced positive of the design element which may thereafter be used to produce on a printing member a reproduction of the design element wherein the outline of the element is defined by a color carrying groove into which empty the color carrying grooves between the ground lines.

Figs. 8 to 15 inclusive, are diagrammatic views which aid in the understanding of the various steps employed in creating a marginally reduced negative which may thereafter be used to produce on a printing member a reproduction of the design element wherein the outline of the element is defined by a color carrying groove, and a color retarding dam is interposed between this groove and the color carrying grooves between the ground lines.

Fig. 16 is a diagrammatic view of a marginally reduced positive similar to the positive shown in Fig. 15 except that the outer band, as shown in Figs. 11 and 15, was created by exposing the film to the light reflecting band through a fine screen so that when the positive was thereafter employed to produce a printing surface that portion of the reproduction outside the color carrying dam instead of being a continuous color carrying groove is made of minute disconnected color carrying wells or pockets; and, Fig. 17 is an enlarged detail of Fig. 16 showing the effect obtained by exposing the film to the light reflecting band through a non-geometric screen.

In practicing this invention to produce a printing member, adapted especially to print solid color designs on fabrics and the like, a positive of an element of the design is prepared in any suitable manner on a transparent film or plate 20, as shown in Fig. 3, wherein the opaque image 21 of the element appears tinted by horizontal lines for purposes of illustration. The image bearing film 20 is mounted on a transparent plate 22, as shown diagrammatically in Fig. 1, with the image bearing face of the film 20 in juxtaposition with the face of a light sensitive member 23, preferably in intimate contact therewith. The light sensitive member 23 may be either a transparent sheet or plate that gradually loses its light transmitting properties when subjected to the action of light, or a light reflecting sheet or plate that gradually loses its light reflecting properties when subjected to the action of light. The light sensitive member 23, in turn, is mounted on the face of a holder 23a which, as shown diagrammatically in Figs. 1 and 2, may be moved to carry the face of the light sensitive member 23 into and out of intimate contact with the image bearing face of the film 20.

After the film 20 and the light sensitive member 23 have been brought into intimate contact, a marginally reduced negative of the design element is created. To more readily understand how this is accomplished let it be assumed that the light sensitive member 23 is of the sort that reflects light and that light from any suitable source is directed against the transparent plate 22. Under these conditions, the light which passes through the plate 22 and through the transparent portion of the film 20 acts to turn dark the oppositely disposed portion of the light sensitive member 23 against which it strikes, as indicated by the vertical lines in Fig. 3. That portion of the light sensitive member 23 opposite the opaque image area 21, being shielded against the action of light retains its light reflecting properties and, as a result, a negative of the design element is created on the light sensitive member 23. Now, let it be assumed that the transparent plate 22 carrying the film 20 is moved edgewise a distance X, as shown in Fig. 4. Under these conditions a marginal portion of the negative on the light sensitive member 23 is bared to the action of light and so loses its light reflecting properties. In consequence, by shifting the transparent plate 22 edgewise in all directions a distance X, or in other words, by revolving it in a circular path having a radius of X distance, a marginal band X distance in width, is bared to the action of light, and when this band turns dark the negative of the design element on the light sensitive member 23 is reduced marginally a distance X as shown in Fig. 5. In like manner a marginally reduced negative would be created on the light sensitive member 23 if the sheet or plate employed was of the sort that gradually lost its light transmitting properties when subjected to the action of light.

For details of mechanism for so moving and revolving the transparent plate 22 reference may be made to U. S. Patent No. 2,191,483 granted to me on February 27, 1940.

After the marginally reduced negative has been thus prepared, the image bearing film (positive of the design element) 20 is removed from in front of the light sensitive member 23, as shown diagrammatically in Fig. 2, and a light sensitive film or plate 24 in a camera 25 is exposed thereto through a lens 26 to create a marginally reduced positive (see Fig. 6) which after developing, is placed in intimate contact with a light sensitive coating on a printing member and then subjected to the action of light to create a negative of the marginally reduced design element in a manner well known in the art. The printing member is then treated to fix the light affected portion of the coating, washed and subjected to the action of acid to etch out the unaffected portion to create a marginally reduced etched reproduction of the original design element in a manner also well known in the art.

In certain cases it is desirable to provide the marginally reduced etched reproduction of the design element with ground lines which serve to support the so-called doctor blade during the printing operation. In such cases the film or plate 24 in the camera is exposed to the marginally reduced negative (Fig. 5) created in the manner explained above through a ground screen. The resulting positive in the camera, as shown diagrammatically in Fig. 7, comprises alternate light affected bands 27 and unaffected bands 28. When the positive thus prepared is employed to create a printing member the etched reproduction of the design element on the printing member is reduced marginally and it comprises alternate color carrying grooves and ground lines.

In certain other cases it is desirable to have the color carrying grooves between the ground lines bounded by a color carrying groove which defines the outline of the design element. In such cases, the transparent plate 22, after the negative on the light sensitive member 23 has been reduced marginally a distance X, as shown in Fig. 5, is moved edgewise a further distance Y, as shown in Fig. 4a, and then revolved in a circular path to bare a light reflecting marginal band Y distance in width to the action of light. While the light reflecting band thus bared is turning dark the film or plate 24 in the camera is exposed thereto to create a positive comprising a light affected band Y distance in width defining the marginally reduced outline of the design element. When the band thus bared to the action of light turns dark the negative of the design element on the light sensitive member 23 is reduced marginally a distance equal to the sum of the X and Y distances as shown in Fig. 4c. After the marginal band has been photographed on the film in the camera, the image bearing film 20 is removed from in front of the light sensitive member 23 and the film or plate 24 in the camera is exposed thereto through a ground screen. The resultant positive, as shown in Fig. 4d, is reduced marginally and it comprises a marginally reduced outline defining band 30, Y distance in width, and a plurality of light affected bands 31 and unaffected bands 32 which merge into the outline defining band 30.

In the event the light sensitive member 23 is of the kind that gradually loses its light transmitting properties when subjected to the action of light, the light instead of being projected through the transparent plate 22 onto the light sensitive member 23 is projected through the light sensitive member 23 while the outline defining band 30 is being photographed onto the film 24 in the camera. Then after the outline defining band 30 has been photographed onto the film in the camera and before the marginally reduced negative on the light sensitive member 23 loses its light transmitting properties, the image bearing film 20 is removed from in front of the light sensitive member 23 through which the light is projected and the film 24 in the camera is again exposed to the marginally reduced negative through a ground screen. The resultant positive in the camera is similar to the positive shown in Fig. 4d which is created when the light sensitive member 23 is light reflecting.

When the positive (4d) thus prepared is employed to create a printing member, the reproduction of the design element is reduced marginally, and it comprises an outline defining color carrying groove into which terminate the color carrying grooves between the ground lines.

In still other cases it is desirable to provide a color retarding dam between the marginally reduced outline defining color carrying groove and the ends of the color carrying grooves between the ground lines. In such cases, as shown diagrammatically in Figs. 8 and 15 inclusive, the image bearing face of the film 20 on the plate 22 is mounted in intimate contact with the face of the light sensitive member 23, as shown in Fig. 8, then moved edgewise a distance X (Fig. 9) and revolved in a circular path to create a marginally reduced negative in the manner heretofore explained. Then the plate 22 carrying the image bearing film 20 is moved edgewise a further distance Y (Fig. 10), and revolved in a circular path to bare to the action of light a band Y distance in width around the outline of the marginally reduced negative; and the band thus bared whether light reflecting or light transmitting is photographed onto the film 24 in the camera as heretofore explained to create a positive comprising a light affected band Y distance in width, as shown in the shaded portion of Fig. 11. Then instead of removing the image bearing film 20 from in front of the light sensitive member 23 as was done in the previous case, the plate 22 carrying the image bearing film 20 is moved edgewise a further distance Z (Fig. 12) and revolved in a circular path. Then regardless of whether the light sensitive member 23 is light reflecting or light transmitting, light is projected through the transparent plate 22, through the transparent portion of the image bearing film 20 and against the band thus bared to the action of light to marginally reduce the negative on the light sensitive member 23 a distance equal to the sum of the distances X, Y, and Z, as shown in Fig. 13. After the negative of the design element on the light sensitive member 23 has been so reduced marginally, the image bearing film 20 is removed and the film or plate 24 in the camera is exposed to the thrice marginally reduced negative through a ground screen (Fig. 14). In the event the light sensitive member 23 is light reflecting the light is projected against the negative but if the light sensitive member 23 is transparent the light is projected through the negative when the negative is being photographed on the film 24 in the camera through the ground screen. The resultant positive, in either case, after being developed, as shown in Fig. 15, comprises a marginally reduced outline defining light affected band 35, Y distance in width, an unaffected band 36, Z distance in width, and alternate light affected bands 37 and unaffected band 38 which terminate against the unaffected band 36. When the positive thus prepared is employed to create a printing member, the etched reproduction of the design element is reduced marginally and it comprises an outline defining color carrying groove and a color retarding dam against which terminate the color carrying grooves between the ground lines.

In still other cases it is desirable to limit the color carrying capacity of the printing area outside the color carrying dam. In such cases a fine screen is introduced in front of the film 24 in the camera while the marginal band Y distance in width is being photographed and then removed before making the last marginal reduction and the other operations which follow. Otherwise, the steps in the process will be precisely the same as those last described. The resulting positive in the camera, after being developed, is illustrated in Fig. 16 and it comprises a narrow band 40, Y distance in width, of very small affected and unaffected areas 41 and 42, respectively, and an unaffected band 43, Z distance in width, against which terminate the alternate affected and unaffected bands 44 and 45, respectively, created by the ground screen. When the positive thus prepared is employed to create a printing member, the reduced marginal portion of the reproduction will comprise a series of minute color carrying cells or pockets instead of by a continuous groove of constant depth and its color carrying capacity reduced accordingly. This feature of reducing the color carrying capacity of the marginal portion of the printing surface is based on the well known fact that the depth of the etch depends upon the area subjected to the action of the acid. In consequence, by varying the sizes of the transparent and opaque areas of the fine screen various reduced color carrying marginal portions may be created on a printing member. For example, it is thus possible to have the marginal portion comprise a great number of very small entirely disconnected color carrying cells or pockets of even or uneven depths, or a great number of small color carrying cells or pockets which run together to form a continuous color carrying groove of uneven depth.

The fine screen preferably employed to reduce the color carrying capacity of the marginal portion of the printing member is non-geometric, that is to say, the transparent and opaque areas do not follow any particular pattern, otherwise a regular line of opaque areas might line up with one portion of the marginal band initially photographed on the film in the camera while a regular line of transparent areas might line up with another portion of the band, in which case the width of the band so photographed and hence the width of the marginal band of the etched reproduction would vary.

In all cases, color spreads beyond the periphery of the etched reproduction during a printing operation, but by regulating the distance X by which the negative on the light sensitive member 23 is initially reduced marginally it is possible to produce impressions on fabrics and the like which are duplicates of the original design element in which case color from adjacent impressions will not run together or flush.

While it has been specified that the desired exposure of the light sensitive member is obtained by revolving the positive in a circular path it is obvious, as is disclosed in the beforementioned patent that the same results could be obtained by revolving the light sensitive member with respect to the positive or by revolving both the positive and the light sensitive member with respect to one another.

Having thus described by invention, I claim:

1. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by producing a relative shifting movement in a circular path between the positive and the light sensitive member such that a marginal band around that portion of the light sensitive member which ordinarily would remain unaffected by the light projected through the positive becomes affected thereby, creating a positive of said negative, and developing the positive of said negative so that it can be used to produce a printing surface.

2. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by producing a relative shifting movement in a circular path between the positive and the light sensitive member such that a marginal band around that portion of the light sensitive member which ordinarily would remain unaffected by the light projected through the positive becomes affected thereby, photographing said negative to obtain a marginally reduced positive of said element, and developing the marginally reduced positive so that it can be used to produce a printing surface.

3. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by shifting the positive in a circular path to expose to the action of the light projected through the positive a marginal band around that portion of the light sensitive member which otherwise would remain unaffected by light, photographing the marginally reduced negative to obtain a marginally reduced positive of the element, and developing the marginally reduced positive so that it can be used to produce a printing surface.

4. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by shifting the light sensitive member in a circular path to expose to the action of light projected through the positive a marginal band around that portion thereon which otherwise would remain unaffected by light, photographing the marginally reduced negative to obtain a marginally reduced positive of the element, and developing the marginally reduced positive so that it can be used to produce a printing member.

5. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by producing a relative shifting movement in a circular path between the positive and the light sensitive member such that a marginal band around that portion of the light sensitive member which ordinarily would remain unaffected by the light projected through the positive becomes affected thereby, photographing said reduced negative through a screen to obtain a marginally reduced screened positive of said element, and developing the screened positive for subsequent use in the preparation of a printing surface.

6. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by shifting the positive in a circular path to expose to the action of light projected through the positive a marginal band around that portion of the light sensitive member which otherwise would remain unaffected by light, photographing said negative through a screen to obtain a marginally reduced screened positive of said element, and developing the screened positive for subsequent use in the preparation of a printing surface.

7. In the process of producing printing surfaces, the steps which comprise creating a positive having a substantially opaque image of a design element on a transparent member, positioning the positive in contact with a light sensitive member, exposing the light sensitive member to the action of light projected through the positive only, creating a marginally reduced negative of the design element on the light sensitive member by shifting the light sensitive member in a circular path to expose to the action of light projected through the positive a marginal band around that portion thereon which otherwise would remain unaffected by light, photographing said negative through a screen to obtain a marginally reduced screened positive of said element, and developing the screened positive for subsequent use in the preparation of a printing surface.

8. In the process of producing printing surfaces, the steps which comprise creating a positive of a design element, mounting said positive in front of a light sensitive member, subjecting said member to the action of light projected through said positive, revolving said positive in a circular path while said member is subjected to the action of light to create a marginally reduced negative of said element, again revolving said positive in a circular path having a greater radius to bare a marginal band around and within the periphery, exposing a light sensitive surface to the marginal band thus bared to create thereon a light affected band which defines the outline of the marginally reduced negative, removing the positive, exposing the light sensitive surface to the negative through a screen to create within the boundary of the light affected band a light affected and unaffected reproduction of the screen, and then developing the light sensitive surface so that it can be used to produce a printing surface.

9. In the process of producing printing surfaces, the steps which comprise creating a marginally reduced negative of a design element, exposing a light sensitive surface to a marginal band of said negative to create thereon a light affected band which defines the outline of the negative, further reducing the negative marginally beyond the band exposed to the light sensitive surface, exposing the light sensitive surface to the further marginally reduced negative through a screen to create within the boundary of the light affected band a light affected and unaffected reproduction of the screen separated from the light affected band by a light unaffected band, and developing said surface so that it may be used to produce a printing member.

10. In the process of producing printing surfaces, the steps which comprise creating a positive of a design element, positioning said positive in front of a light sensitive member, subjecting said member to the action of light projected through said positive, creating movement between said member and said positive while said member is subjected to the action of said light to produce a marginally reduced negative of said element, exposing a light sensitive surface to a marginal band around the outline of said negative to create thereon a light affected band which defines the outline of the reduced negative, creating additional movement between said member and said positive while said member is subjected to the action of light projected through said positive to marginally reduce the negative beyond the band to which the light sensitive surface was exposed, again exposing the light sensitive surface to the additional marginally reduced negative through a screen to create within the light affected band a light affected and unaffected reproduction of the screen which is separated therefrom by a light unaffected band, and developing the light sensitive surface so that it can be used to produce a printing surface.

11. In the process of producing printing surfaces, the steps which comprise creating a positive of a design element, positioning said positive in front of a light sensitive member, subjecting said member to the action of light projected through said positive, creating movement between said member and said positive while said member is subjected to the action of said light to produce a marginally reduced negative of said element, creating additional movement between said member and said positive to bare a marginal band around the outline of the negative, exposing a light sensitive surface to said band to create thereon a light affected band which defines the outline of the reduced negative, creating additional movement between said member and said positive to reduce marginally the negative beyond the band to which the light sensitive surface was exposed, again exposing the light sensitive surface through a screen to the negative as finally reduced marginally to create within the light affected band a light affected and unaffected reproduction of said screen which is separated therefrom by a light unaffected band, and developing the light sensitive surface so that it can be used to produce a printing surface.

12. In the process of producing printing surfaces, the steps which comprise creating a marginally reduced negative of a design element, exposing a light sensitive surface through a fine screen to only a marginal band of the negative around and within the periphery thereof, and then exposing the light sensitive surface to the negative through a ground screen.

13. In the process of producing printing surfaces, the steps which comprise creating a marginally reduced negative of a design element, exposing a light sensitive surface through a nongeometric screen to only a marginal band of said negative around and within the periphery thereof, and then exposing the light sensitive surface to the central portion of the negative through a ground screen in such manner that the reproductions of the screen lines on the light sensitive surface fall short of the reproduction of the marginal band.

14. In the process of producing printing surfaces, the steps which comprise creating a positive of a design element, mounting said positive in front of a light sensitive member, subjecting said member to the action of light projected through said positive, creating revolving movement between said positive and said member in a circular path having a predetermined radius while said member is subjected to the action of said light to create a marginally reduced negative of said element on said surface, creating revolving movement between said positive and said member in a circular path having a greater radius to bare a light reflecting marginal band of said negative, exposing a film to said band to create thereon a light affected band which defines the outline of the negative, creating revolving movement between said positive and said member in a circular path having a still greater radius while said member is being subjected to the action of light projected through the positive to reduce the negative marginally beyond the band to which the film is exposed, and exposing the film through a screen to the reproduction on the surface as finally reduced marginally to create within the outline of the light affected band a light affected and unaffected reproduction of the screen which is spaced therefrom by a light unaffected band.

15. In the process of producing printing surfaces, the steps which comprise creating a positive of a design element, mounting said positive in front of a light sensitive member, creating revolving movement between said positive and said member in a circular path having a predetermined radius while said member is subjected to the action of light projected through said positive to create a marginally reduced negative of said element creating revolving movement between said positive and said member in a circular path having a greater radius to bare a marginal band of said negative, exposing a film to the band thus bared through a fine screen, creating revolving movement between said positive and said member in a circular path having a still greater radius while said member is subjected to the action of light projected through said positive to marginally reduce the negative beyond the band to which the film was exposed, and exposing the film through a ground screen to the negative as finally reduced marginally.

16. In the process of producing printing surfaces, the steps which comprise creating a positive of a design element, mounting said positive in front of a light sensitive member, revolving said positive in a circular path having a predetermined radius and subjecting said member to the action of light projected through said positive to create a marginally reduced negative of said element, revolving said positive in a circular path having a greater radius to bare a light reflecting marginal band around the periphery of said negative, exposing a film to the band thus bared, revolving said positive in a circular path having a still greater radius and subjecting said member to the action of light projected through said positive to marginally reduce the negative beyond the band to which the film was exposed, and exposing the film through a screen to the negative as finally reduced marginally.

17. In the process of producing printing surfaces, the steps which comprise creating a positive of a design element, mounting said positive in front of a light sensitive member, revolving said positive in a circular path having a predetermined radius while said member is subjected to the action of light projected through said positive to create a marginally reduced negative of the element, revolving said positive in a circular path having a greater radius to bare a light reflecting band around the periphery of said negative, exposing a film to the band thus bared through a fine nongeometric screen, revolving said positive in a circular path having a still greater radius while said member is subjected to the action of light projected through said positive to marginally reduce the negative beyond the band to which the film was exposed, and exposing the film through a ground screen to the negative as finally reduced marginally.

18. In the process of producing printing surfaces, the steps which comprise creating a positive of a design element, mounting said positive in front of a light reflecting surface which loses its light reflecting properties when subjected to the action of light, creating movement between said positive and said surface, subjecting that portion of said surface exposed during said movement to the action of light to create a marginally reduced negative, and photographing said negative.

19. In the process of producing printing surfaces, the steps which comprise creating a positive of a design element, mounting said positive in front of a light reflecting surface which loses its light reflecting properties when subjected to the action of light, creating movement between said positive and said surface, subjecting that portion of said surface exposed during said movement to the action of light to create a marginally reduced negative, and photographing said negative through a screen.

20. In the process of producing printing surfaces, the steps which comprise creating a positive of a design element, mounting said positive in front of a light reflecting surface which loses its light reflecting properties when subjected to the action of light, creating movement between said positive and said surface, subjecting that portion of said surface exposed during said movement to the action of light to create a marginally reduced negative, creating additional movement between said positive and said surface to bare a marginal band around said negative, exposing a film to said band while said band is exposed to the action of light, removing said positive, and exposing the film to the negative while the negative is subjected to the action of light.

21. In the process of producing printing surfaces, the steps which comprise creating a positive of a design element, mounting said positive in front of a light reflecting surface which loses its light reflecting properties when subjected to the action of light, creating movement between said positive and said surface, subjecting that portion of the surface exposed during such movement to the action of light to create a marginally reduced negative, creating additional movement between said positive and said surface to bare a marginal band around said negative, exposing a film to said band, subjecting said band to the action of light, creating further movement between said positive and said surface, subjecting that portion of the surface exposed during said further movement until the negative is reduced marginally beyond the band to which the film was exposed, removing said positive, exposing the film to the negative as finally reduced, and subjecting the negative to the action of light.

22. In the process of producing printing surfaces, the steps which comprise creating a positive of a design element, mounting said positive in front of a light reflecting surface which loses its light reflecting properties when subjected to the action of light, creating movement between said positive and said surface, subjecting that portion of the surface exposed during such movement to the action of light to create a marginally reduced negative, creating additional movement between said positive and said surface to bare a marginal band around said negative, exposing a film to said band through a fine screen, subjecting said band to the action of light, creating further movement between said positive and said surface, subjecting that portion of the surface exposed during said further movement until the negative is reduced marginally beyond the band to which the film was exposed, removing said positive, exposing the film to the negative as finally reduced, and subjecting the negative to the action of light.

OWEN R. HUGGINS.